H. W. Moore's  Improvement in Car Wheels.
104053  Fig. 1  PATENTED JUN 7 1870
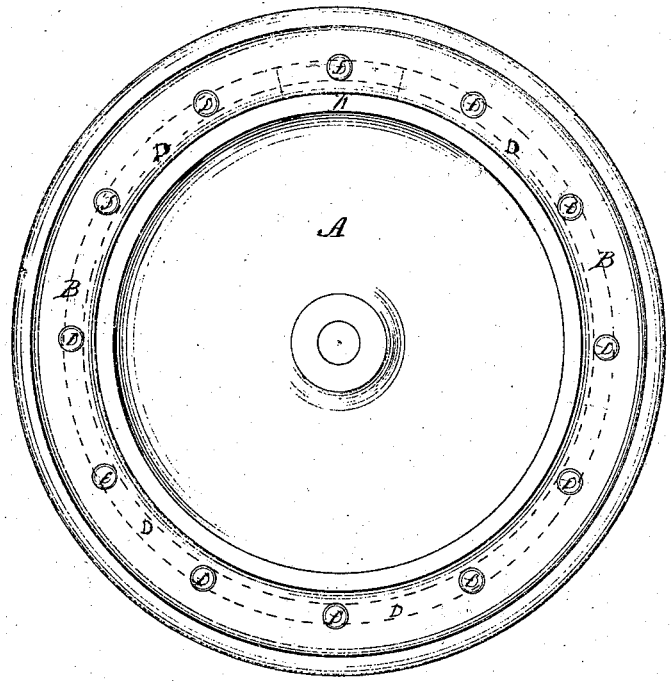
Fig. 2
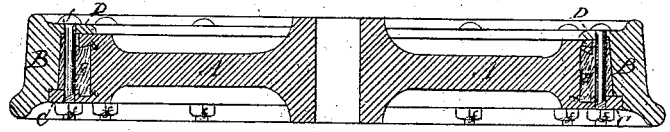
Witnesses  L. Wetmore  H. W. Moore
F. W. Bloodgood  Inventor

United States Patent Office.

HIRAM W. MOORE, OF JERSEY CITY, NEW JERSEY.

Letters Patent No. 104,053, dated June 7, 1870.

IMPROVEMENT IN CAR-WHEELS.

The Schedule referred to in these Letters Patent and making part of the same.

Be it known that I, HIRAM W. MOORE, of Jersey City, county of Hudson and State of New Jersey, have invented certain Improvements in Car-Wheels.

The nature of my invention consists in additional improvements upon a car-wheel, for which Letters Patent were granted to me June, 22, 1869, which specifies a cushion of wood as being inserted in a peculiar manner between the hub and the tread of the wheel, to destroy the metallic vibration between the tread and the hub, and thereby reduce, to a great extent, the noise arising from a solid wheel.

In that invention, however, no means were provided for holding the tire or outer rim upon the inner wheel, should it become cracked or broken, but the pieces would instantly fly off from the wood, and before there could be any indication of any danger.

These additional improvements are to avoid this difficulty by the introduction of two flanges, one on each rim of A and B, as shown, at C and D in section, and through these flanges the clamping or binding bolts pass, thereby holding the two rims together, even though one or both of them might be cracked or broken.

Description of the Drawing.

Figure 1 is an elevation of my wheel, showing the outside, or that face opposite the flange.

Figure 2 is a section of same through the center of the wheel.

General Description.

A, figs. 1 and 2, represents the inner portion of the wheel, cast in any desired form as to the hub and whatever may connect it with the rim thereof, such as spokes or disks, either plain or corrugated, but, at E E in the rim, a recess or groove is formed in any convenient manner, either in the process of casting or upon a lathe, and into said recess blocks of wood are fitted, as already specified in my previous patent.

I may here remark, however, that, in practice, I have found it very convenient to form the sides of said recess with square corners, as at $t$, fig. 2, instead of a dovetail, as at $d$, so as to receive a tenon, but the principle remains the same, both devices being merely to hold the wood in position to be properly dressed for receiving the tire or tread-rim of the wheel.

The outer rim or tread is shown at B, figs. 1 and 2, and made exactly as already specified in the previous patent, with the addition of a flange, as at D, on its outer face, sufficiently deep to receive the binding or clamping bolts $t\ t\ t$ which draw the two metal portions of the wheel together.

These bolts pass through said flange and a corresponding one, as at C, formed on the rim of A, or the inner wheel, and on its inner face, so that the two flanges inclose the wood completely when the wheel is completed.

By the bolts passing thus through portions of the outer and inner rims, it is manifest that both will, to same degree, be held together, even if they should be cracked to such an extent as to fall apart, if constructed as specified in my previous patent.

Claim.

I claim as my invention—

The improvement upon my described car-wheel, consisting of the flanges C and D, constructed and applied as described.

H. W. MOORE.

Witnesses:
   CHS. WETMORE,
   F. W. BLOODGOOD.